(12) United States Patent
Rychen et al.

(10) Patent No.: US 7,309,441 B2
(45) Date of Patent: Dec. 18, 2007

(54) ELECTROCHEMICAL STERILIZING AND BACTERIOSTATIC METHOD

(75) Inventors: Philippe Rychen, Muespach-le-haut (FR); Laurent Pupunat, Muespach-le-haut (FR); Tsuneto Furuta, Fujisawa (JP); Masao Sekimoto, Fujisawa (JP); Hozumi Tanaka, Fujisawa (JP); Yoshinori Nishiki, Fujisawa (JP); Shuhei Wakita, Fujisawa (JP)

(73) Assignee: Permelec Electrode Ltd., Kanagawa (JP)

( * ) Notice: Subject to any disclaimer, the term of this patent is extended or adjusted under 35 U.S.C. 154(b) by 478 days.

(21) Appl. No.: 10/895,317

(22) Filed: Jul. 21, 2004

(65) Prior Publication Data
US 2005/0023227 A1   Feb. 3, 2005

(30) Foreign Application Priority Data
Jul. 29, 2003   (JP)   ............. P. 2003-281655

(51) Int. Cl.
*B01D 17/06* (2006.01)
(52) U.S. Cl. .................. 210/748; 204/290.15
(58) Field of Classification Search ............ 210/748; 204/290.15
See application file for complete search history.

(56) References Cited

U.S. PATENT DOCUMENTS 5,900,127 A    5/1999   Iida et al.

6,375,827 B1 *  4/2002   Kurosu et al. ............. 205/687

FOREIGN PATENT DOCUMENTS

EP   0 994 074 A2   4/2000
WO   WO 02/26636 A1   4/2002

OTHER PUBLICATIONS

T. Furuta et al., "*Legionella* inactivation with diamond electrodes" Science Publishers (2004) vol. 13. No. 11-12, pp. 2016-2019.
European Search Report dated Jan. 11, 2005.
Official Communication from EPO dated Jan. 19, 2006.

* cited by examiner

*Primary Examiner*—Robert Hopkins
(74) *Attorney, Agent, or Firm*—Sughrue Mion Pllc.

(57) ABSTRACT

A method is disclosed, which is capable of subjecting microorganisms to sterilizing or bacteriostatic treatment with good efficiency as compared with the conventional sterilizing or bacteriostatic method using a noble metal electrode. Microorganism-containing water to be treated is electrochemically treated using an anode having conductive diamond to bring the microorganism into contact with the anode, thereby undergoing sterilization. Since the conductive diamond has a high oxidation potential as compared with other electrode substances, direct oxidation reaction due to contact between a microorganism in water to be treated, such as *Legionella* bacteria, and the anode surface occurs strongly as compared with other electrodes, thereby enabling effective sterilization. The conductive diamond has a high ability to generate ozone and has an excellent formation efficiency with respect to the generation of hydrogen peroxide and radicals. Accordingly, an indirect sterilizing effect can also be expected.

12 Claims, 1 Drawing Sheet

FIGURE
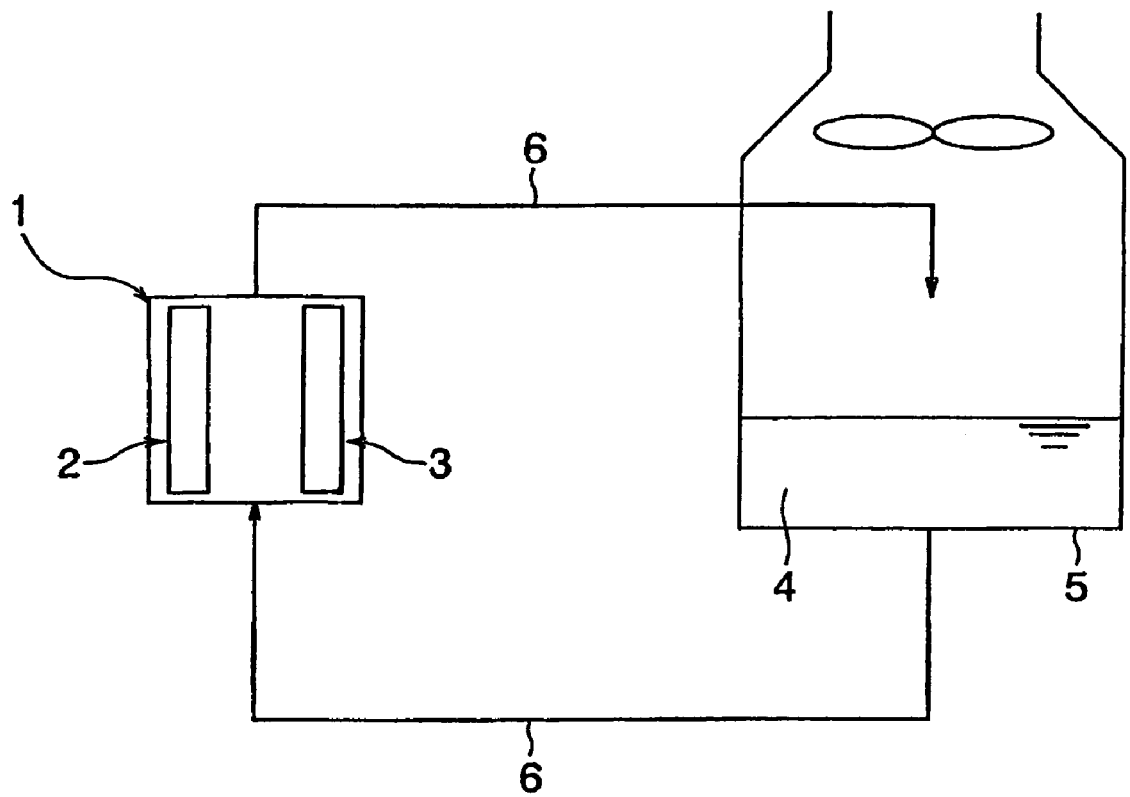

ELECTROCHEMICAL STERILIZING AND BACTERIOSTATIC METHOD

FIELD OF THE PRESENT INVENTION

The present invention relates to an electrochemical sterilizing or bacteriostatic method of microorganisms such as *Legionella* bacteria with good efficiency.

DESCRIPTION OF THE RELATED ART

In recent years, infectious diseases caused by *Legionella* bacteria are being a social problem. *Legionella* bacteria inhabit widely in the world of nature such as soils, rivers, and lakes and marshes and propagate by utilizing metabolites of other bacteria or algae or living on amoebae or other bacterium parasitic protozoa. By sucking aerosols (fine drops of water) generated from artificial water contaminated with *Legionella* bacteria, human bodies are infected with the *Legionella* bacteria. Examples of equipment of likely generating aerosols include cooling towers for air conditioning, circulating hot-water supply equipment, humidifiers, and decorative fountains.

In cooling towers for air conditioning, although a small amount of water is replenished, the greater part of cooling water is circulated and used. Accordingly, unless cleaning up and liquid exchange are periodically performed, the propagation of *Legionella* bacteria is unavoidable. In the hot water to be supplied, if the hot-water supply temperature is maintained at high temperature of at least 55° C., it is possible to avoid the propagation of *Legionella* bacteria. However, in recent years, from the reasons of energy saving, stability and convenience, the hot-water supply temperature tends to decrease. Thus, there is fear of the propagation of *Legionella* bacteria in hot water to be supplied.

Examples of surroundings where there is every possibility of the generation of aerosols include water of fountains and waterfalls (generic name: water for landscape) provided in parks or open spaces, courtyards or interiors of buildings, and the like. As a link in the chain of effective uses of water resources, regenerated water obtained by further highly treating rainwater or sewage-treated water, etc. is being used for this purpose, and the danger of infections becomes large.

A heat insulating circulation type bath, so-called "24-hour bath" propagates microorganisms effective for purification on a filter medium and suppresses suspending substances by the filter medium and purifies water in the bath by utilizing predacious and oxidation decomposing functions of these microorganisms. Water in the bath purified in such a purification system can reduce "general bacteria" and "coliform bacilli" as an index of microorganism contamination of water as compared to drinking water. However, it is known that the *Legionella* bacteria propagate while utilizing organic materials or other microorganisms trapped by the filter medium in the purification system thereof.

As described previously, the opportunity of infections with *Legionella* bacteria in the living surroundings is increasing. Accordingly, technologies of taking measures to enable sterilizing or bacteriostatic treatment safely and surely against human bodies occupy the interest. Though sterilization by ultraviolet rays or photocatalysts is meaningful in view of preservation of the water quality, frequent exchange or repair of a lamp is necessary, and hence, such is not economical. Although the ozone injection method involves such an advantage that it is free from the generation or retention of decomposition products, since ozone is a gas, this method is required to be provided with equipment in which the safety against human bodies is thoroughly taken into account is necessary and is hardly generalized. The addition method of bactericides such as metal ions is proposed but may possibly lead to new environmental pollution.

The sterilizing method utilizing oxidation reaction by a hypochlorous acid ion has hitherto been widely utilized. For example, JP-A-2002-248478 describes that it is preferred to add a hypochlorous acid ion such that the residual chlorine concentration becomes from 0.1 to 3 ppm, and preferably from 0.5 to 2 ppm. However, there was encountered such a problem of safety that noxious and dangerous hypochlorous acid must be conveyed and stored in the treatment site. Also, there is some possibility of forming noxious organic chlorine compounds represented by trihalomethanes in the reaction step of hypochlorous acid and an organic material, and excessive addition may possibly cause secondary pollution so that influences against human bodies or device conduits is problematic.

As an improvement system for utilizing the foregoing effective chlorine components, there is proposed an electrolysis system. A method in which by adding a trace amount of salt to circulating water and electrolyzing the mixture, a hypochlorous acid ion is formed, and its sterilizing action is utilized is disclosed (see JP-A-11-319840). Further, JP-A-2002-89895 discloses electrolytic sterilization for humidifiers; and JP-A-2002-70944, JP-A-11-179364, JP-A-11-90129, and JP-A-11-10157 disclose an electrolysis system as a circulating purification device of water for bath. Further, JP-A-8-117757, JP-A-7-108273, and JP-A-8-126889 disclose a sterilizing method of *Legionella* bacteria mainly in cooling towers.

It is known that in the oxidation reaction in an anode, oxidizing agents (for example, effective chlorine and ozone) effective for water treatment are formed, and active seeds such as OH radicals are partly generated. Water containing such materials is generalized in the name of active water, functional water, ion water, sterile water, etc. (*Kyosansei Denkaisui no Kisochishiki*, Ohmsha, Ltd., 1997). Recently, electrolytic acidic water is admitted as disinfecting water having a sterilizing ability by Ministry of Health, Labour and Welfare ("hypochlorous acid water" as an item admitted as a food additive under the Food Sanitation Law (revised) noticed in Bulletin No. 212 of Ministry of Health, Labour and Welfare on Jun. 10, 2002) and is being generalized as water for sanitation management in hospitals and food factories. It is reported that the electrolytic acidic water has a sterilizing effect against *Legionella* bacteria.

In these electrolysis systems, it is necessary to choose a material having durability in practical use and free from secondary pollution by elution, etc. as the anode. Examples of anodes that can be chosen include lead oxide, tin oxide, platinum, DSA, and carbon. However, a lead oxide anode may possibly elute at the time of stopping of the electrolysis; and a tin oxide electrode becomes in the passive state especially at the interface of a substrate thereof, and therefore, it is hardly used over a long period of time. Also, since carbon is oxidized and consumed, it is hardly used over a long period of time. Accordingly, the practically useful anode is only a platinum or noble metal-coated metallic electrode represented by DSA.

However, even in these anodes, since oxygen generation reaction from water is preferential within the range of a small chloride ion concentration so that chlorine gas formation reaction hardly advances, it was necessary to generate effective chlorine and the like by supplying an excessive chloride ion and an electric current. An increase of the electric current was problematic in view of economy as the electrolytic device. Also, the addition of even a trace amount of salt (electrolytic auxiliary) and the concentration management were time-consuming.

As a method of solving the problems of a platinum or noble metal-coated metallic electrode, it is disclosed in JP-A-7-299467 to utilize an anode containing conductive diamond. Further, JP-A-2000-254650 discloses that an oxygen-containing gas is supplied into a cathode chamber side having a gas diffusing cathode to form hydrogen peroxide or a hypochlorous acid ion having high bactericidal activity, and water to be treated is subjected to sterilizing treatment by utilizing this. In this regard, though it is described to use conductive diamond as an anode, the subject conductive diamond is used for the formation of the hydrogen peroxide.

However, even when conductive diamond is used for the formation of hydrogen peroxide, the chemical concentration merely increases, but the sterilizing mechanism is never fundamentally improved.

SUMMARY OF THE INVENTION

Accordingly, an object of the present invention is to provide an electrochemical sterilizing and bacteriostatic method, which is basically different from the conventional water treatment with a chemical.

A first embodiment of the present invention is to provide an electrochemical sterilizing method comprising electrochemically treating microorganism-containing water to be treated using an anode having conductive diamond to bring the microorganism into contact with the anode, thereby undergoing sterilization.

A second embodiment of the present invention is to provide an electrochemical bacteriostatic method comprising electrochemically treating microorganism-containing water to be treated using an anode having conductive diamond to suppress propagation of the microorganism.

BRIEF DESCRIPTION OF THE DRAWING

The FIGURE is a schematic view to show one embodiment of an electrolytic cell that can be employed in the electrochemical sterilizing and bacteriostatic method according to the present invention.

In the drawing:
1: Electrolytic cell
2: Anode
3: Cathode
4: Water to be treated
5: Tank
6: Conduit

DETAILED DESCRIPTION OF THE INVENTION

The present invention will be described below in detail.

Conductive diamond has been used for the electrolytic formation of a variety of substances. The present inventors made extensive and intensive investigations regarding applications of the conductive diamond. As a result, it has been found that when conductive diamond is used as an electrode substance of an anode for electrochemical treatment, it has an effective electrochemical treating function, especially a high sterilizing and bacteriostatic function, leading to accomplishment of the present invention.

Further, as is known, when conductive diamond is used as an anode, hydrogen peroxide or hypochlorous acid is formed, whereby a remarkable sterilizing and bacteriostatic effect is revealed due to a sterilizing and bacteriostatic function by the formed chemicals such as hydrogen peroxide in addition to a sterilizing and bacteriostatic function of the conductive diamond itself. Accordingly, when water to be treated, which contains microorganisms such as bacteria, protozoa, and planktons, is electrochemically treated using conductive diamond as an anode substance, the foregoing microorganisms are sterilized, and by turning on electricity continuously or intermittently, their propagation is suppressed. A sterilizing effect is obtained by treating a part or the whole of the foregoing water to be treated.

Since a conductive diamond anode has a high oxidation potential, direct oxidation reaction due to contact between a microorganism and the anode surface occurs strongly as compared with other electrodes and largely contributes to sterilization of the microorganism.

Furthermore, when the water to be treated dissolves a trace amount of a chloride ion therein, effective chlorine such as chlorine gas and hypochlorous acid is generated, and the water to be treated is subjected to sterilizing or bacteriostatic treatment mainly deriving from this effective chlorine. In particular, the conductive diamond anode is high with respect to a formation efficiency of effective chlorine such as hypochlorous acid as compared with other noble metal electrodes and can form effective chlorine having a desired concentration from a low-concentration chloride, for example, salt. It is desired that the concentration of the chloride ion is 200 ppm or lower, and the conductive diamond anode has a markedly excellent efficiency for forming chlorine within this concentration range as compared with other noble metal electrodes. Further, the conductive diamond has a high ability to generate ozone and has an excellent formation efficiency with respect to the generation of hydrogen peroxide and radicals. Accordingly, an indirect sterilizing effect can also be expected.

When a trace amount of salts is dissolved in water to be treated, the conductivity of the solution increases so that an electrolytic voltage can be reduced. Therefore, such is convenient. From this standpoint, it is preferred to add a chloride to tap water having low conductivity, etc.

On the other hand, when electrolytes other than the chloride ion are co-existent, it can be expected that microorganisms are inactivated with peroxides formed by electrolytic oxidation of a sulfuric acid ion, a carbonic acid ion, etc. However, since the sterilizing effect may lower when a large amount of peroxides is present, it is preferred to keep the amount of such electrolytes within an adequate range.

In cooling water towers, water having a low concentration of salts, such as tap water, is replenished as the raw material. However, since the salts are usually concentrated 5-10 times due to evaporation of water, it is not necessary to add electrolytes.

The main reaction between an anode and a cathode in an electrolytic cell where a chloride ion is present is as follows.

Anode:

$$Cl^- = Cl_2 + 2e \qquad (1.36 \text{ V})$$

$$Cl_2 + H_2O = HCl + HClO$$

$$2H_2O = O_2 + 4H^+ + 4e \qquad (1.23 \text{ V})$$

$$3H_2O = O_3 + 6H^+ + 6e \qquad (1.51 \text{ V})$$

$$2H_2O = H_2O_2 + 2H^+ + 2e \qquad (1.78 \text{ V})$$

Cathode:

$$2H_2O + 2e = H_2 + 2OH^-  \quad (0.84\ V)$$

In the case where oxygen is present, the cathodic reaction is as follows.

$$O_2 + 2H^+ + 2e = H_2O_2 \quad (0.34\ V)$$

$$O_2 + 4H^+ + 4e = H_2O \quad (0.4\ V)$$

The conductive diamond anode that can be used in the present invention is produced by supporting diamond, which is a deposited substance resulting from reduction of an organic material, as a carbon source on an electrode substrate. With respect to the material quality of the substrate, there are no particular limitations so far as it is conductive. For example, plate-shaped materials, mesh-shaped materials, rod-shaped materials, pipe-shaped materials, sphere-shaped materials (for example, beads), or perforated plate-shaped materials as a chatter fibrous sintered body, made of conductive silicon (for example, mono-crystalline, polycrystalline, or amorphous silicon), silicon carbide, titanium, niobium, tantalum, carbon, nickel, etc.

The method of supporting diamond on such a substrate is not particularly limited, and arbitrary measures can be employed. Examples of representative production processes of diamond include the heat filament CVD (chemical vapor deposition) process, the microwave plasma CVD process, the plasma arc jet process, and the physical vapor deposition (PVD) process. In any of these processes, a mixed gas of a hydrogen gas and a carbon source is used as the diamond raw material. In order to impart conductivity to diamond, a trace amount of an element having a different valency is added. As the element to be added in a trace amount, boron, phosphorus, and nitrogen are desired, and its content is preferably 1-100,000 ppm, and more preferably 100-10,000 ppm. Besides, electrodes prepared by supporting a synthetic diamond powder produced from a carbon powder as the raw material under ultra-high pressure or together with a binder such as resins on the support can be used.

Where hydrogen generation represented by the above-described reaction schemes is performed, inexpensive iron, nickel, stainless steel, carbon, etc., can be used as a cathode catalyst. Where oxygen gas cathodic reaction for forming hydrogen peroxide is performed, gold, metals or oxides thereof, or carbon such as graphite and conductive diamond, is preferable as the cathode catalyst. Such a catalyst is used in the plate-shaped state as it is. Alternatively, the catalyst is formed at a coverage of 1-100 g/m² on a plate, a metal net, a powdered sintered body, or a metallic fiber sintered body each having corrosion resistance, such as stainless steel, zirconium, silver, and carbon, by the heat decomposition method, the fixing method by a resin, the composite plating method, etc.

As a cathode supply body, carbon, metals such as nickel and titanium, and alloys or oxides thereof are used. When a hydrophobic sheet is disposed on the back surface of the cathode in the side opposite the anode, such is effective because it is possible to control the gas supply to the reaction surface. As the oxygen-containing gas as the raw material, while air or gases from commercially available cylinders may be used, a gas generated from the anode can be utilized. Where a gas chamber is present on the back surface of the electrode, oxygen is supplied to the gas chamber. Besides, oxygen may be previously blown and absorbed in water to be treated.

The electrolytic cell that is used for the electrochemical treatment may be either a non-diaphragm one-chamber type electrolytic cell in which only an anode and a cathode are disposed or a two-chamber type electrolytic cell in which an anode chamber and a cathode chamber are partitioned from each other using a diaphragm such as a porous diaphragm and an ion exchange membrane between an anode and a cathode. The presence or absence of a diaphragm and the material quality of a cathode substrate may be properly determined from the standpoints of the properties of water to be treated and operability. As this electrolytic cell, existing electrolytic cells or ones in which only an anode is exchanged can be used, and the electrolytic cells may be disposed in an existing conduit. In many cases, it is not necessary to newly add equipment such as a pump. It is an effective utilization of existing circulating lines that a part of circulating water in an existing conduit is branched into the existing conduit and used as an electrolytic liquid.

With respect to the material of the electrolytic cell, it is preferable to use hydrocarbon resins such as PP, PVC, and PE, glass lining materials, carbon, titanium, stainless steel, fluorocarbon resins, and the like.

As the ion exchange resin, both fluorocarbon resins and hydrocarbon resins are useful, but the former is preferable from the standpoint of corrosion resistance. The ion exchange membrane has a function to prevent each of ions formed in the anode and the cathode from consumption in a counter electrode thereto and further to rapidly advance the electrolysis even in the case where the conductivity of the liquid is low.

In the present invention, the electrochemical treatment condition of water to be treated in which a conductive diamond anode is used is properly set up such that the treatment effectively proceeds. For example, the current density is set up at 0.01-50 A/dm², and the electrolytic temperature is set up at 5-40° C. In the electrochemical sterilization according to the present invention, ultrasonic waves can be employed together. This is effective because the electrochemical treatment is performed with good efficiency while promoting the mass transfer. It is desired that a distance between the both electrodes to be used is made small for the purpose of reducing a resistance loss. However, it is desired to set up the distance at 0.5-10 mm for the purposes of making a pressure loss in supplying water small and keeping the flow distribution uniform.

As described previously, it is preferable that the chloride ion concentration is 200 ppm or lower, the lower limit of which is 1 ppm, and more effectively 5-50 ppm. In the case of water to be treated containing a large amount of metal ions, such as tap water, well water, and seawater, there is some possibility that metal hydroxides or carbonates are precipitated on the surface of the cathode, whereby the electrochemical treatment is retarded. To prevent this, by passing a reverse current at adequate intervals (usually from one minute to 10 hours) depending upon applications, the cathode chamber is acidified, whereas the anode chamber is made alkaline. Thus, the flow of generated gas and supply water is accelerated, and the separation of deposits proceeds with ease.

Since the catholyte is alkaline, by discarding a part thereof and replenishing neutral raw material water, it is possible to maintain circulating water weakly acidic. To inhibit the corrosion of conduits in the circulation system device and enhance the sterilizing effect, it is preferred to set up the pH at 3-10, and preferably 4-6.

The water to be treated in the sterilizing and bacteriostatic method according to the present invention includes cooling water for air conditioning, hot water to be supplied, water for circulation type bath, water for landscape, and industrial water, and especially circulating water to be re-used upon circulation.

The electrochemical sterilizing and bacteriostatic treatment of the present invention is to perform the sterilizing or bacteriostatic treatment of water to be treated using conductive diamond as the anode catalyst. Since the conductive diamond has a high oxidation potential as compared with other electrode substances, direct oxidation reaction due to contact between a microorganism in water to be treated, such as *Legionella* bacteria, and the anode surface occurs strongly as compared with other electrodes and largely contributes to sterilization of the microorganism. In the sterilizing or bacteriostatic treatment of water to be treated, when a chloride ion or the like is added, a sterilizing and bacteriostatic ability due to chemicals such as hypochlorous acid is added to a sterilizing and bacteriostatic ability of the conductive diamond itself, thereby making it possible to perform the sterilizing and bacteriostatic treatment of water to be treated at a thoroughly satisfactory level. In particular, the conductive diamond is high with respect to a formation efficiency of hypochlorous acid, etc. as compared with other electrode substances, thereby making it possible to perform effectively the sterilizing and bacteriostatic treatment.

Accordingly, in comparison with the sterilization only by the conventional addition of a chloride ion, the addition amount of the chloride ion can be largely reduced to a necessary and minimum extent, and therefore, the practical values become high. Further, since the addition amount of the chloride ion can be reduced, it is possible to prevent the corrosion of conduits for circulating water and devices and to largely reduce the frequency of exchanging circulating water and the number of times of cleaning the device. Thus, it is possible to realize economical electrochemical treatment of water to be treated.

An embodiment of a preferred electrolytic cell that can be employed in the electrochemical sterilizing and bacteriostatic method according to the present invention will be described with reference to FIG. 1.

FIG. 1 is a schematic view to show one embodiment of an electrolytic cell that can be employed in the electrochemical sterilizing and bacteriostatic method according to the present invention.

An electrolytic cell 1 shown in the drawing is a non-diaphragm one-chamber type electrolytic cell, and an anode 2 made of conductive diamond as an anode catalyst and a cathode 3 made of nickel, iron, or conductive diamond as a cathode catalyst are disposed separately from each other within the electrolytic cell 1. A tank 5 containing water 4 to be treated having microorganisms such as *Legionella* bacteria and containing a chloride ion is disposed adjacent to this electrolytic cell 1.

The whole or a part of the water 4 to be treated within the tank 5 is supplied through a conduit 6 within this electrolytic cell 1. First, the supplied water to be treated is brought into direct contact with conductive diamond as an anode catalyst, whereby the microorganisms within the water to be treated are oxidatively sterilized; secondly, the chloride ion is anodically oxidized with conductive diamond to form a chlorine gas and further hypochlorous acid depending upon the pH, whereby the microorganisms are sterilized with these chemicals; and thirdly, oxygen and ozone are formed by usual water electrolysis, thereby performing sterilization of the microorganisms.

In the cathode 3, hydrogen generation reaction by usual water electrolysis and reaction in which a part of oxygen generated in the anode 2 proceed.

In the electrolytic cell 1 or the conduit 6, the microorganisms and formed chemicals react with each other, thereby performing sterilization of the microorganisms.

Besides the illustrated embodiment, electrodes can be placed within the conduit 6 or the tank 5.

Further, a two-chamber type electrolytic cell in which an anode chamber and a cathode chamber are partitioned from each other using a diaphragm may be employed in place of the illustrated one-chamber type electrolytic cell. In the two-chamber type electrolytic cell, it is possible to prevent hypochlorous acid, etc., formed in the anode from occurrence of reduction and decomposition in the cathode. Furthermore, while it is known that the sterilizing effect by hypochlorous acid ion is enhanced in the acidic side, the pH can be adjusted individually in the anode chamber and the cathode chamber in the two-chamber type electrolytic cell, and therefore, it is easy to enhance the sterilizing effect. That is, since the anolyte is acidified, whereas the catholyte becomes alkaline, by discarding a part of the catholyte and replenishing neutral raw material water, it is possible to keep circulating water weakly acidic.

The electrochemical sterilizing and bacteriostatic method according to the present invention will be described below with reference to the following Examples, but it should not be construed that the present invention is limited thereto.

EXAMPLE 1

Electrodes prepared by forming conductive diamond in a thickness of about 2 μm on a mono-crystalline silicon substrate having a thickness of 1 mm by the heat filament CVD process were used as an anode and a cathode, respectively, and the both electrodes were disposed such that a distance between the electrodes was 1 mm, to prepare an electrolytic cell shown in FIG. 1. The both electrode had an electrode area of 70 $cm^2$.

Water to be treated containing 58,000,000 CFU/L of *Legionella* bacteria and adjusted so as to have a chloride ion of 30 ppm by dissolving salt therein was prepared and subjected to electrochemical treatment by passing an electric current of 0.5 $A/dm^2$ therethrough while supplying the water to be treated in a proportion of 160 liters/hr to the electrolytic cell. The water to be treated after storing for 60 minutes was analyzed. As a result, 99.99% or more of the *Legionella* bacteria were extinct. According to the analysis using a DPD reagent, the water to be treated had an effective chlorine concentration corresponding to 0.6 ppm.

EXAMPLE 2

The treatment was carried out under the same condition as in Example 1, except using 200 ppm of a chloride ion and passing an electric current of 0.25 $A/dm^2$. The water to be treated after storing for 60 minutes was analyzed. As a result, 99.98% of the *Legionella* bacteria were extinct.

EXAMPLE 3

The treatment was carried out under the same condition as in Example 1, except using 200 ppm of a chloride ion and passing an electric current of 0.5 $A/dm^2$. The water to be treated after storing for 5 minutes, 20 minutes and 60 minutes, respectively was analyzed. As a result, 99.98%, 99.99% and 100% of the *Legionella* bacteria were extinct, respectively.

EXAMPLE 4

The treatment was carried out under the same condition as in Example 1, except using 3.5 ppm of a chloride ion and passing an electric current of 1.5 A/dm². In the water to be treated after storing for 60 minutes, 0.2 ppm of effective chlorine was formed, and 89% of the *Legionella* bacteria were extinct.

EXAMPLE 5

The treatment was carried out under the same condition as in Example 1, except using 3.5 ppm of a chloride ion and passing an electric current of 1 A/dm². The water to be treated after storing for 60 minutes was analyzed. As a result, 30% of the *Legionella* bacteria were extinct.

In Examples 4 and 5, the chloride ion concentration was low so that the sterilizing effect under the condition of the Examples was low. However, the propagation of the *Legionella* bacteria at the initial stage was suppressed, and therefore, it was noted that a bacteriostatic function was revealed.

COMPARATIVE EXAMPLE 1

Tap water containing 44,000,000 CFU/L of *Legionella* bacteria (effective chlorine vanished) was prepared. Even after storing for 60 minutes, the number of bacteria did not change. Accordingly, it was confirmed that in tap water in which effective chlorine vanished, neither sterilization nor inactivation proceeded.

COMPARATIVE EXAMPLE 2

When hypochlorous acid was injected in an amount of 1 ppm, 0.7 ppm and 0.2 ppm, respectively into tap water containing 58,000,000 CFU/L of *Legionella* bacteria, the time necessary for obtaining a rate of extinction of 99.99% (1,000 CFU/L or lower) was within 1 minute, 5 minutes and 20 minutes, respectively. In order to achieve the extinction substantially completely within 60 minutes, 0.7 ppm of effective chlorine was necessary.

COMPARATIVE EXAMPLE 3

Water to be treated was subjected to electrochemical treatment under the same condition as in Example 1, except that an anode made of DSE ($IrO_2$) was used. As a result of the analysis, 99% of the *Legionella* bacteria were extinct. At this time, effective chlorine corresponding to 0.3 ppm was formed, and the formation concentration was a half as compared with the case of the conductive diamond anode.

It should further be apparent to those skilled in the art that various changes in form and detail of the invention as shown and described above may be made. It is intended that such changes be included within the spirit and scope of the claims appended hereto.

This application is based on Japanese Patent Application No. 2003-281655 filed Jul. 29, 2003, the disclosure of which is incorporated herein by reference in its entirety.

What is claimed is:

1. An electrochemical sterilizing method comprising electrochemically treating microorganism-containing water to be treated using an anode having conductive diamond to bring the microorganism into contact with the anode, thereby undergoing sterilization, wherein the water to be treated contains chloride ion in an amount of from 1 to 200 ppm.

2. The method as claimed in claim 1, wherein the microorganism is a *Legionella* bacterium.

3. The method as claimed in claim 1, wherein the water to be treated contains chloride ion in an amount of from 5 to 50 ppm.

4. The method as claimed in claim 1, wherein the water to be treated is selected from the group consisting of cooling water for air conditioning, hot water supply, water for a circulation bath, water for landscaping use and industrial water.

5. The method as claimed in claim 1, wherein the water to be treated comprises circulating water for re-use upon circulation.

6. The method as claimed in claim 1, which comprises adjusting the chloride ion content in the water to be treated to within a range of from 30 to 200 ppm and passing an electric current of 0.25 A/dm² or higher therethrough such that 99.98% or higher of bacteria originally present in the water to be treated are made extinct.

7. An electrochemical bacteriostatic method comprising electrochemically treating microorganism-containing water to be treated using an anode having conductive diamond to suppress propagation of the microorganism, wherein the water to be treated contains chloride ion in an amount of from 1 to 200 ppm.

8. The method as claimed in claim 7, wherein the microorganism is a *Legionella* bacterium.

9. The method as claimed in claim 7, wherein the water to be treated contains chloride ion in an amount of from 5 to 50 ppm.

10. The method as claimed in claim 7, wherein the water to be treated is selected from the group consisting of cooling water for air conditioning, hot water supply, water for a circulation bath, water for landscaping use and industrial water.

11. The method as claimed in claim 7, wherein the water to be treated comprises circulating water for re-use upon circulation.

12. The method as claimed in claim 7, which comprises adjusting the chloride ion content in the water to be treated to within a range of from 30 to 200 ppm and passing an electric current of 0.25 A/dm² or higher therethrough such that 99.98% or higher of bacteria originally present in the water to be treated are made extinct.

* * * * *